March 9, 1948.  D. R. EASTWOOD  2,437,295
CUTTING DEVICE
Filed June 28, 1944  2 Sheets-Sheet 1
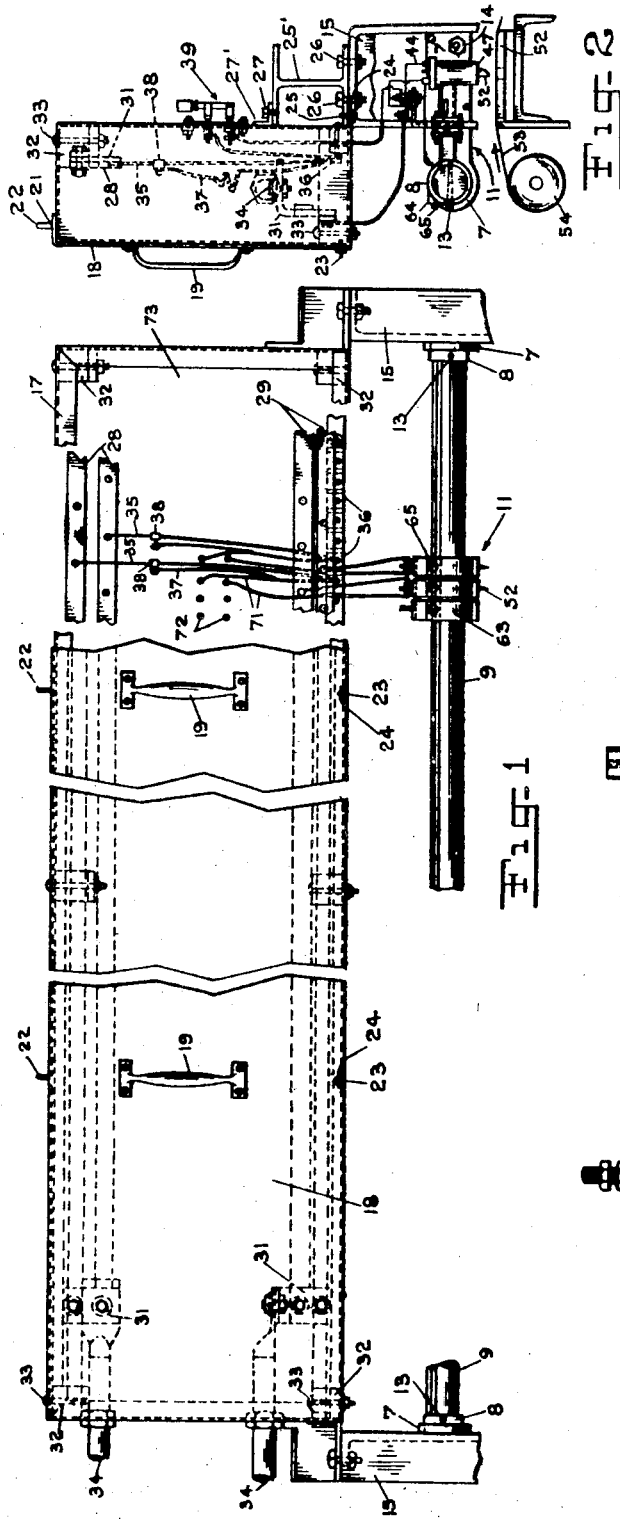
INVENTOR.
DONALD R. EASTWOOD
BY
ATTORNEYS.

March 9, 1948. D. R. EASTWOOD 2,437,295
CUTTING DEVICE
Filed June 28, 1944 2 Sheets-Sheet 2
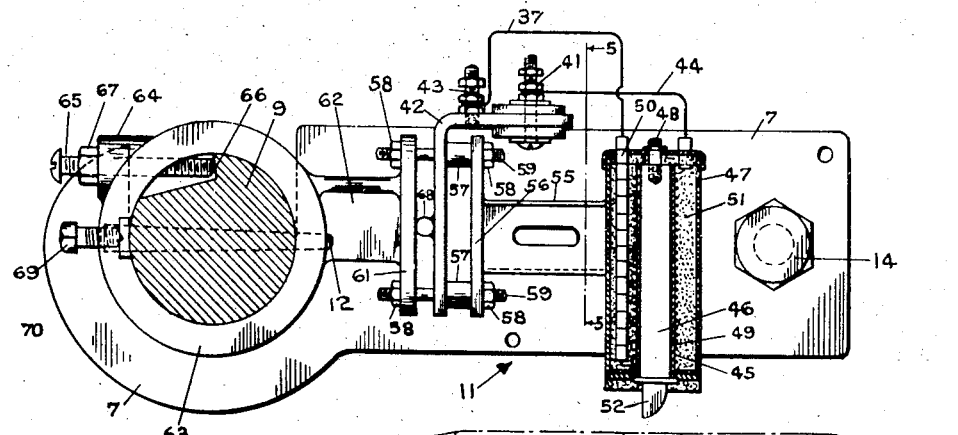
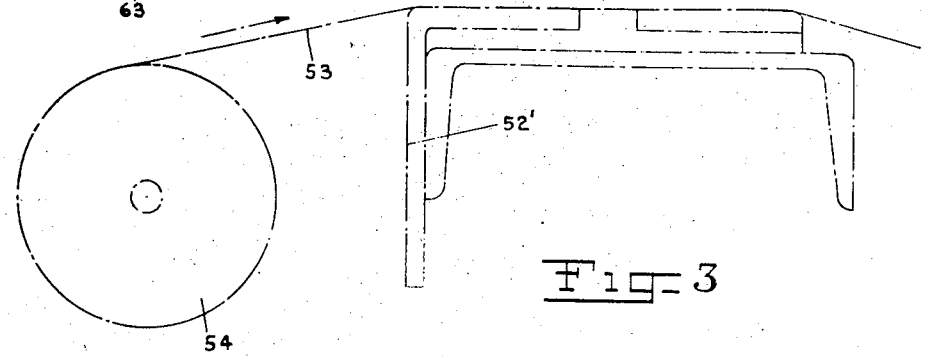
Fig. 3
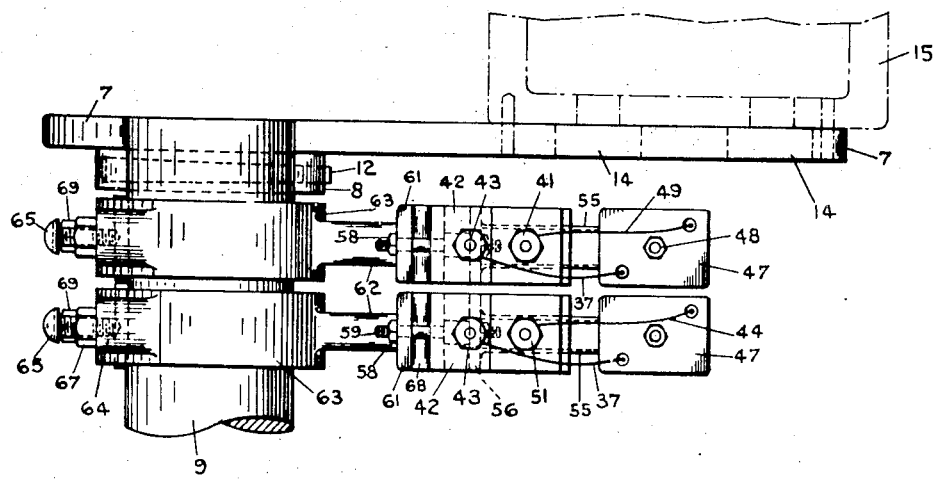
Fig. 4
INVENTOR
DONALD R. EASTWOOD.
BY
ATTORNEYS.

Patented Mar. 9, 1948

2,437,295

UNITED STATES PATENT OFFICE 2,437,295

CUTTING DEVICE

Donald R. Eastwood, Drummondville, Quebec, Canada, assignor to Celanese Corporation of America, a corporation of Delaware Application June 28, 1944, Serial No. 542,579

16 Claims. (Cl. 164—38)

1

This invention relates to devices for cutting sheets or webs, and relates more particularly to improved cutting means for dividing into narrower widths or ribbons, sheets or webs having a basis of a thermoplastic material, especially woven fabric webs made of or containing webs, yarns or threads having a basis of a thermoplastic material.

In the cutting of a web of fabric made of or containing threads, yarns or filaments having a basis of a thermoplastic material, into narrower widths or ribbons, it has been found that the use of heated cutting elements or knives yields highly satisfactory results. Heated cutting elements not only act to sever the fabric web but also to seal simultaneously with the severing the severed edges by softening or melting the threads, yarns or filaments of thermoplastic material. Thus, heated cutting elements are eminently suitable for severing webs having a basis of cellulose acetate or other organic derivative of cellulose, such as cellulose propionate and cellulose butyrate, ethyl cellulose and benzyl cellulose, as well as webs having a basis of condensation products of cellulose and glycols or other polyhydric alcohols, or a basis of synthetic linear polyamide condensation products, such as polyamides derived from amino acids or from the condensation products of diamines with carboxylic acid, e. g. polyhexamethylene adipamide. The web may be composed entirely of one of the above thermoplastic compounds or of a mixture of two or more of such compounds. Moreover, the heated cutting elements satisfactorily sever webs of mixed fabric containing threads, yarns or filaments of a thermoplastic material together with fibers of vegetable or animal sources such as, for example, natural silk, cotton, wool, linen, as well as synthetic non-thermoplastic cellulosic threads, yarns or filaments.

It is an important object of this invention to provide a novel and improved electrically heated device for the hot cutting of sheets or webs having a basis of a thermoplastic material.

Another object of this invention is the provision of a hot cutting device having a plurality of cutting elements, any desired number of which cutting elements may be employed during a sheet or web severing operation.

A further object of this invention is the provision of a novel and improved hot cutting element.

Still another object of this invention is the provision of a hot cutting element provided with means for adjusting and maintaining the temperature thereof.

Other objects of this invention, together with certain details of construction and combinations of parts, will appear from the following detailed description and accompanying drawings.

In the drawing, wherein a preferred embodiment of my invention is shown,

Figure 1 is a rear elevational view of the supporting means for the heated cutting elements and the terminal box, said terminal box being broken away to show the bus bars and wire connections for supplying electric current to the heating coils of the cutting elements, Figure 2 is a side elevational view of the structure shown in Figure 1 and in addition shows the relation of the cutting means to the cutting table for supporting the sheet or web to be cut, Figure 3 is a side elevational view, on an enlarged scale and partly in section, of a cutting element and supporting an adjusting arrangement, Figure 4 is a top plan view of the structure shown in Figure 3 but showing two cutting elements, Figure 5 is a detailed view taken on line 5—5, and Figure 6 is a detailed view of the cutting element per se.

Like reference numerals indicate like parts throughout the several views of the drawings.

Referring now to the drawing for a detailed description of the present invention, and particularly to Figures 1 and 2, the reference numeral 7 indicates supporting arms, each provided with a collar 8 for receiving a shaft 9 on which one or more cutting element assemblies, generally indicated by reference numeral 11, may be mounted as will hereinafter more specifically be described. Shaft 9 is held against rotation by means of a tapered pin 12 (see Figures 3 and 4) passing through the collar 8 and the shaft 9. Supporting arms 7 are attached by means of two or more bolts 14 to a main supporting frame 15 of suitable construction.

Supported on main frame 15 in a manner hereinafter set forth is a terminal box 17. This terminal box has a perforated top for ventilation, is open at the bottom and is provided with a cover 18 having handles 19 for ease of handling said cover. In order to hold the cover 18 in position on the terminal box, the upper edge of the cover is bent at right angles and the bent portion is provided with holes 21 which are adapted to be hooked over pins 22 soldered or otherwise fixed to the top of the terminal box. The bottom of the cover is slotted at 23, the slots cooperating with wing nut locking members 24. The terminal box 17 is maintained in position on main supporting frame 15 by means of a flange 24' on said terminal box bolted to said frame 15 by means of a bolt 25 and an H-beam 25' bolted at 26 to main supporting frame 15 and at 27 to one arm of said H-beam through an angle iron 27' welded to said terminal box.

The terminal box is provided with a pair of bus bars 28 and a pair of ground bus bars 29, the bus bars of each pair being connected by plates 31. One of the bus bars of each pair is attached to hardwood insulating blocks 32 which are held in position by bolts 33. The bus bars are connected to a suitable transformer (not shown) by cables 34. The bus bars are preferably of copper and are of such size as to accommodate the maximum load, that is, the load required when all of the cutting elements are in operation.

Slide wires 35 are connected to bus bars 28 and to terminal strip 36. A heater cord 37 cooperates with the slide wire 35 in order to adjust the temperature of the cutting element, the one end of heater cord being held in adjusted position with respect to the slide wire by means of a collar 38 slidably mounted on the slide wire. The other end of heater cord 37 is connected to the terminal on terminal strip 36, thence through knife switch generally indicated by reference numeral 39 to terminal 41 mounted on, but insulated from bracket 42. The other terminal 43 is fixed directly to bracket 42 and is mounted to ground bus bars 29 by means of a bare copper wire 44.

The cutting element consists of a heater coil 45, connected to grounded terminal 43 and insulated terminal 41, surrounding the knife 46 housed in a casing 47, the knife being fixed in the casing by means of a stud or nut 48. The heater coil is insulated from knife 46 by means of a suitable tube 49 and the heater coil leads are insulated from the casing by means of porcelain fish spine beads 50. The space between the heater coil and the casing is filled with a suitable heat insulating powder 51. Only the blade portion 52 of knife 46 extends from the casing 47.

Positioned beneath the cutting element or elements and extending the full width of the cutting device is a table 52' for supporting the sheet or web 53 fed thereover from a suitable source of supply 54. The cutting elements are mounted so that the angularity of the cutting edge of blade 52 may be adjusted with respect to sheet or web 53 on table 52'. Thus, casing 47 is joined by means of a Z-beam 55 to a plate 56 which is spaced from terminal bracket 42 by collars 57. The plate 56 and terminal bracket 42 are connected by means of nuts 58 and bolts 59 to a plate 61 integral with an arm 62 which is integral with collar 63 adapted to be mounted on shaft 9. Collar 63 is provided with a boss 64 which is threaded to receive a jack-screw 65 which cooperates with a shoulder 66 formed by milling out a portion of shaft 9 along the full length thereof.

The jack-screw 65 serves two purposes. When individual cutting elements are not required, they can be raised clear of the sheet or web being severed and locked in an inoperative position by means of said jack-screw 65 and lock-nut 67. It is also employed in conjunction with cylindrical rod 68, welded to terminal bracket 42, nuts 58 and bolts 59 to adjust the angularity of blade 52. For example, if it is found that the angle between the blade 52 and sheet or web 53 is too great or too small, it may be corrected by manipulating the nuts 58 on bolts 59, so as to cause movement of bracket 42, plate 56 and casing 47, as a unit, about rod 68 as fulcrum. The height of the heating element is then adjusted by means of jack-screw 65. Final adjustments are preferably made after the knives are up to required temperature as uneven heating causes distortion. After final adjustment, collar 63 is firmly clamped to shaft 9 by means of set screw 69 tightened on set screw pad 70. The spacing of the knives is preferably effected by means of a scale, of a length equal to the full length of the cutting machine, suitably calibrated, which is laid on the cutting table 52' underneath the knives. The use of the long scale tends to reduce, if not substantially eliminate, the possibility of a cumulative error which may creep in where a short scale is employed.

The temperature of the knives is controlled by a thermocouple in a pilot element and a suitable controller, such as a Bristol Model 478 pyrometer controller. The cutting elements other than the pilot element are adjusted to produce the same knife temperature as the pilot elements by means of the individual slide wires 35, referred to above, and then uniform temperatures can be maintained by the controller.

Means are provided to deenergize the heating coils of the individual cutting elements. To this end, there are provided individual knife switches, such as the switch indicated by reference numeral 39, said switches being provided with the required electrical connections 71, which pass through the openings 72 in plate 73.

It is to be understood that the foregoing detailed description is given merely by way of illustration and that many variations may be made therein without departing from the spirit of my invention.

Having described my invention, what I desire to secure by Letters Patent is:

1. In a device for severing a sheet or web containing thermoplastic material, a cutting element, means for heating said cutting element by means of electrical energy, said heating means including a heating coil adjacent to said cutting element, and a plurality of bus bars having electrical connections to said cutting element, and means for effecting an angular adjustment of said cutting element with respect to the sheet or web being severed.

2. In a device for severing a sheet or web containing thermoplastic material, a cutting element, means for heating said cutting element by means of electrical energy, said heating means including a heating coil adjacent to said cutting element and a plurality of bus bars having electrical connections to said heating coil, and means including a slide wire cooperating with the electrical connections between said bus bars and said heating coil for adjusting the temperature of said cutting element.

3. In a device for severing a sheet or web containing thermoplastic material, a shaft, a cutting element mounted thereon, means for heating said cutting element and means, including a fulcrumed bracket, a jack-screw cooperating with said shaft, for effecting an adjustment of said cutting element with respect to the sheet or web being severed.

4. In a device for severing a sheet or web containing thermoplastic material, a cutting element, a housing for said cutting element, means in said housing for heating said cutting element, a fulcrumed bracket for supporting said housing and means, including said fulcrumed bracket, for adjusting the position of said housing and thereby effecting an angular adjustment of said cutting element with respect to the sheet or web being severed.

5. In a device for severing a sheet or web containing thermoplastic material, a cutting element, a housing for said cutting element, a heating coil in said housing for heating said cutting element, a fulcrumed bracket for supporting said housing and means, including said fulcrumed bracket, for adjusting the position of said housing and thereby effecting an angular adjustment of said cutting element with respect to the sheet or web being severed.

6. In a device for severing a sheet or web containing thermoplastic material, a cutting element, a housing for said cutting element, a heating coil in said housing for heating said cutting element, material in said housing for insulating said heating coil from said cutting element, a fulcrumed bracket for supporting said housing and means, including said fulcrumed bracket, for adjusting the position of said housing and thereby effecting an angular adjustment of said cutting element with respect to the sheet or web being severed.

7. In a device for severing a sheet or web containing thermoplastic material, a shaft, a plurality of cutting elements mounted on said shaft, means for effecting individual angular adjustment of said cutting elements with respect to the sheet or web being severed and means cooperating with said shaft for effecting individual vertical adjustment of said cutting elements with respect to the sheet or web being severed.

8. In a device for severing a sheet or web containing thermoplastic material, a shaft, a plurality of cutting elements mounted on said shaft, means for individually heating said cutting elements and means on each of said cutting elements cooperating with said shaft for holding the cutting element in inoperative position.

9. In a device for severing a sheet or web containing thermoplastic material, a shaft, a plurality of cutting elements mounted on said shaft, means for individually heating said cutting elements, means for effecting an angular adjustment of said cutting elements with respect to the sheet or web being severed and means cooperating with said shaft for effecting vertical adjustment of said cutting elements with respect to the sheet or web being severed.

10. In a device for severing a sheet or web containing thermoplastic material, a shaft, a plurality of cutting element assemblies, each comprising a cutting element and means for supporting said cutting element, mounted on said shaft, means on said support for effecting an angular adjustment of said cutting element and means cooperating with said shaft for effecting vertical adjustment of said cutting element, and means for individually heating said cutting elements.

11. In a device for severing a sheet or web containing a thermoplastic material, a shaft, a plurality of cutting element assemblies, each comprising a cutting element and means for supporting said cutting element, mounted on said shaft, means for effecting individual angular adjustment of said cutting elements with respect to the sheet or web being severed, means cooperating with said shaft for effecting vertical adjustment of said cutting elements with respect to the sheet or web being severed, means for individually heating said cutting elements, said heating means comprising a heating coil adjacent to said cutting element, and means for supplying electrical energy to said heating coil.

12. In a device for severing a sheet or web containing a thermoplastic material, a shaft, a plurality of cutting element assemblies, each comprising a cutting element and means for supporting said cutting element, mounted on said shaft, means for effecting individual angular adjustment of said cutting elements with respect to the sheet or web being severed, means for individually heating said cutting elements, said heating means comprising a heating coil surrounding said cutting element, and means including a plurality of bus bars having electrical connections to each of said heating coils for supplying electrical energy to said heating coil.

13. In a device for severing a sheet or web containing a thermoplastic material, a shaft, a plurality of cutting element assemblies, each comprising a cutting element and means for supporting said cutting element, mounted on said shaft, means for effecting individual angular adjustment of said cutting elements with respect to the sheet or web being severed, means for individually heating said cutting elements, said heating means comprising a heating coil surrounding said cutting element, means including a plurality of bus bars having electrical connections to said heating coil for supplying electrical energy thereto and means on each of said cutting element assemblies cooperating with said shaft for holding said cutting element in inoperative position.

14. In a device for severing a sheet or web containing a thermoplastic material, a shaft, a plurality of cutting element assemblies mounted on said shaft, each of said assemblies comprising a housing, means for supporting said housing and a cutting element and means for heating said cutting element carried in said housing, and means for supplying electrical energy to said cutting element heating means.

15. In a device for severing a sheet or web containing a thermoplastic material, a shaft, a plurality of cutting element assemblies mounted on said shaft, each of said assemblies comprising a housing, means for supporting said housing and a cutting element and means for heating said cutting element carried in said housing, and means for supplying electrical energy to said cutting element heating means, said electrical energy supplying means comprising a terminal box mounted adjacent to said shaft and having bus bars therein electrically connected to said heating means and to a source of supply of electrical energy.

16. In a device for severing a sheet or web containing a thermoplastic material, a shaft fixed against rotation, a plurality of cutting element assemblies mounted on said shaft, each of said assemblies comprising a housing, means for supporting said housing a cutting element and means for heating said cutting element carried in said housing means for supplying electrical energy to said heating means, said electrical energy supplying means comprising a terminal box mounted adjacent to said shaft and having bus bars therein electrically connected to said heating means and to a source of supply of electrical energy, means for effecting individual angular adjustment of said cutting elements with respect to the sheet or web being severed, and means on each of said cutting elements cooperating with said shaft for holding the cutting element in inoperative position.

DONALD R. EASTWOOD.

REFERENCES CITED

The following references are of record in the file of this patent:

UNITED STATES PATENTS

| Number | Name | Date |
| --- | --- | --- |
| 1,445,992 | Cameron | Feb. 20, 1923 |
| 1,724,208 | Lewis | Aug. 13, 1929 |
| 2,035,138 | Maxfield | Mar. 24, 1936 |
| 2,086,238 | Platt | July 6, 1937 |
| 2,251,282 | Huizeng | Aug. 5, 1941 |
| 2,327,468 | Stocker | Aug. 24, 1943 |